(12) United States Patent
Seibold et al.

(10) Patent No.: US 9,815,960 B2
(45) Date of Patent: Nov. 14, 2017

(54) RUBBER MIXTURE AND HOSE CONTAINING THE RUBBER MIXTURE

(71) Applicant: ContiTech MGW GmbH, Hannoversch-Muenden (DE)

(72) Inventors: Sebastian Seibold, Hannoversch-Muenden (DE); Dieter Borvitz, Hannover (DE)

(73) Assignee: ContiTech MGW GmbH, Hannoversch-Munich (DE)

( * ) Notice: Subject to any disclaimer, the term of this patent is extended or adjusted under 35 U.S.C. 154(b) by 143 days.

(21) Appl. No.: 14/880,868

(22) Filed: Oct. 12, 2015

(65) Prior Publication Data

US 2016/0032075 A1     Feb. 4, 2016

Related U.S. Application Data

(63) Continuation of application No. PCT/EP2014/051985, filed on Feb. 3, 2014.

(30) Foreign Application Priority Data

Apr. 15, 2013 (DE) .......................... 10 2013 103 759

(51) Int. Cl.
*C08K 3/04* (2006.01)
*B32B 25/02* (2006.01)
(Continued)

(52) U.S. Cl.
CPC .................. *C08K 3/04* (2013.01); *B32B 1/08* (2013.01); *B32B 5/024* (2013.01); *B32B 25/02* (2013.01);
(Continued)

(58) Field of Classification Search
CPC .......... C08K 3/04; C08K 3/0008; C08K 7/24; C08K 2003/045; B32B 25/02;
(Continued)

(56) References Cited

U.S. PATENT DOCUMENTS

| 5,356,681 A | 10/1994 | Ichikawa et al. |
| 6,340,511 B1 | 1/2002 | Kanbe et al. |
| 2008/0072984 A1* | 3/2008 | Branch .................... B32B 1/08 138/124 |

FOREIGN PATENT DOCUMENTS

| DE | 10 2011 055 316 A1 | 5/2013 |
| EP | 1 396 670 A1 | 3/2004 |
| WO | 2012/080158 A1 | 6/2012 |

OTHER PUBLICATIONS

ASTM Committee D11 on Rubber, "Standard Test Methods for Rubber-Viscosity, Stress Relaxation, and Pre-Vulcanization Characteristics (Mooney Viscometer)", Designation:D 1646-00, 2000, pp. 1 to 12.

(Continued)

*Primary Examiner* — Michael C Miggins
(74) *Attorney, Agent, or Firm* — Walter Ottesen, P.A.

(57) ABSTRACT

The disclosure relates to a rubber mixture which contains at least one fluorine rubber and at least one active filler and carbon nanotubes. The rubber mixture has an additionally improved tear propagation resistance and, at the same time, improved processability. The disclosure further relates to a hose having at least the following layer structure: an inner layer as a barrier layer against aggressive media, which contains at least one fluorine rubber and at least one active filler and carbon nanotubes; and, an outer layer made of a cross-linked rubber mixture.

18 Claims, 1 Drawing Sheet

(51) Int. Cl.
- *B32B 25/14* (2006.01)
- *B32B 25/18* (2006.01)
- *B32B 1/08* (2006.01)
- *C08K 3/00* (2006.01)
- *C08K 7/24* (2006.01)
- *F16L 11/08* (2006.01)
- *B32B 5/02* (2006.01)
- *B32B 25/10* (2006.01)
- *B32B 25/04* (2006.01)
- *F16L 11/04* (2006.01)

(52) U.S. Cl.
CPC ............ *B32B 25/042* (2013.01); *B32B 25/10* (2013.01); *B32B 25/14* (2013.01); *B32B 25/18* (2013.01); *C08K 3/0008* (2013.01); *C08K 7/24* (2013.01); *F16L 11/04* (2013.01); *F16L 11/085* (2013.01); *B32B 2264/108* (2013.01); *B32B 2270/00* (2013.01); *B32B 2307/4026* (2013.01); *B32B 2597/00* (2013.01); *C08K 3/045* (2017.05)

(58) Field of Classification Search
CPC   B32B 25/14; B32B 25/18; B32B 1/08; B32B 2597/00; B32B 5/024; B32B 25/10; B32B 2264/108; B32B 2307/4026; B32B 25/042; B32B 2270/00; F16L 11/085; F16L 11/04

See application file for complete search history.

(56) References Cited

OTHER PUBLICATIONS

Deutsches Institut fuer Normung, e.V. (DIN), "Pruefung von Kautschuk und Elastomeren—Bestimmung von Reissfestigkeit, Zugfestigkeit, Reissdehnung und Spannungswerten im Zugversuch", DIN 53504: Oct. 2009, pp. 1 to 19.

Deutsches Institut fuer Normung, e.V. (DIN), Elastomere oder thermoplastische Elastomere—Bestimmung der Eindringhaerte—Teil 1: Durometer-Verfahren (Shore-Haerte) (ISO 7619-1:2010), DIN ISO 7619-1, Feb. 2012, pp. 1 to 17.

Deutsches Institut fuer Normung, e.V. (DIN), "Haertepruefung nach Shore A und Shore D" (Testing of rubber—Shore A and Shore D hardness test), DIN 53505, Aug. 2000, pp. 2 to 5.

Deutsches Institut fuer Normung, e.V. (DIN), Elastomere oder thermoplastische Elastomere—Bestimmung des Weiterreisswiderstandes—Teil 1: Streifen-, winkel- und bogenfoermige Probekoerper (ISO 34-1:2004), DIN ISO 34-1, Jul. 2004, pp. 1 to 16.

International Search Report dated Apr. 1, 2014 of international application PCT/EP2014/051985 on which this application is based.

Byravan, A. et al, "Effect of mineral fillers in improving mechanical properties of FKM vulcanizates", Rubber World, Feb. 1, 2013, ISSN 0035-9572, 11 pages.

* cited by examiner

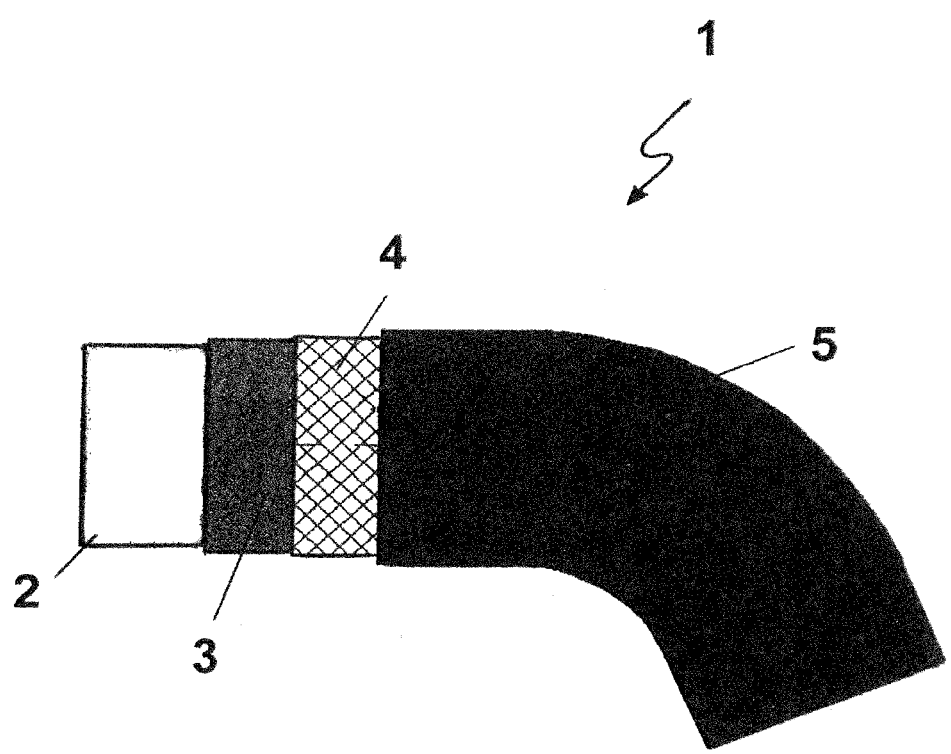

RUBBER MIXTURE AND HOSE CONTAINING THE RUBBER MIXTURE

CROSS REFERENCE TO RELATED APPLICATIONS

This application is a continuation application of international patent application PCT/EP2014/051985, filed Feb. 3, 2014, designating the United States and claiming priority from German application 10 2013 103 759.3, filed Apr. 15, 2013, and the entire content of both applications is incorporated herein by reference.

FIELD OF THE INVENTION

The disclosure relates to a rubber mixture and to a hose which has at least the following layer structure:
an internal layer as barrier layer with respect to aggressive media which comprises at least one fluoro rubber, and
an external layer made of a crosslinked rubber mixture.

BACKGROUND OF THE INVENTION

In the simplest case the hose is a two-layer hose without embedded reinforcement layer, that is, composed exclusively of an internal layer and an external layer. The duplex extrusion process is relevant in this context. However, the arrangement mostly has, between the internal layer and the external layer, a reinforcement layer composed of one or more sublayers. There can also be further layers present alongside the main two-layer structure and the reinforcement layer.

Because the internal layer with barrier layer function with respect to the medium to be transported requires solvent resistance and also high temperature resistance, the internal layer is preferably made from a fluoro rubber mixture. The crosslinking in these mixtures, known as FKM mixtures, and also as FPM mixtures, can use polyols and quaternary ammonium salts, described as by way of example in U.S. Pat. No. 5,356,681 or else in U.S. Pat. No. 6,340,511, or bisphenols and/or peroxides, described as by way of example in EP 1 396 670 B1.

An important consideration in the use of fluoro rubber mixtures, particularly in the use as internal layer in hoses, is that the rubber mixture has good tear-propagation resistance. The internal layer is intended to function as barrier layer with respect to aggressive media, for example acids or fuels, and great importance is therefore attached to the tear resistance thereof, in particular the tear-propagation resistance.

A conventional method for increasing tear-propagation resistance is controlled undercrosslinking of the mixture. The method here is that in the case of mixtures crosslinked by bisphenols the content of bisphenol is reduced, and in the case of mixtures crosslinked by peroxides the content of the organic peroxide and/or the content of co-crosslinking agent, for example TAIC, TAC, or TRIM, is reduced. However, this leads to significantly reduced tensile strengths. DE 10 2011 055 316 A1 has already disclosed that the use of active fillers in fluoro rubber mixtures leads to improved tear-propagation resistance. However, addition of active fillers, in particular active carbon blacks, to fluoro rubber mixtures raises the viscosity, and thus impairs the processing of the rubber mixture.

SUMMARY OF THE INVENTION

It is therefore an object of the present disclosure to provide a rubber mixture which comprises fluoro rubber and features improved tear-propagation resistance and at the same time improved processability.

The object is achieved in that the rubber mixture, which comprises at least one fluoro rubber, also comprises at least one active filler, that is, one filler which exhibits significant interaction with the polymers used, and comprises carbon nanotubes.

Surprisingly, it has been found that the tear-propagation resistance of fluoro rubber mixtures can be further optimized if the rubber mixture also comprises carbon nanotubes, alongside active filler. At the same time, addition of the carbon nanotubes causes only a slight increase in the viscosity of the rubber mixture. This makes it possible to reduce the proportion of the active fillers, and thus to lower the viscosity, with resultant improved processability.

The person skilled in the art makes a distinction between active fillers and inert fillers: the former use interaction with the polymer(s) resulting inter alia from the reactive surface of these fillers, for example, from polar groups, to influence the properties of the material; the latter exert no influence on the property profile of the rubber mixture and in practice serve merely to increase volume.

Examples of active fillers that can be used for the purposes of this invention are active carbon blacks, magnesium carbonate, active precipitated silica, fumed silica, condensed silica, calcium silicates and aluminum silicates, fibers (short and long fibers, glass fibers, carbon fibers, aramid fibers), whiskers (aluminum oxide, silicon carbide), mica, zinc oxide, core/shell fillers, and others.

In particular the use of active carbon black has proven to be advantageous in respect of tear properties. Classification of a carbon black as active or inert depends in essence on its specific surface area. Carbon blacks classified as active are generally all of those where the iodine number, also termed iodine absorption number, of the carbon black is from 60 to 300 g/kg in accordance with ASTM D1510, and the DBP number thereof is from 60 to 150 $cm^3/100$ g. For the DBP number in accordance with ASTM D2414, dibutyl phthalate is used to determine the specific absorption volume of a carbon black or of a pale-colored filler. Carbon blacks classified as, and used as, active carbon blacks are therefore preferably those classed as N-1xx, N-2xx, or else N-3xx. The carbon blacks are classified in accordance with the classification table in ASTM D1765 06. Carbon blacks in the N-2xx and N-1xx series have particularly good properties.

The silicas used in the rubber industry are generally precipitated silicas, which are in particular classified in accordance with their surface area. Here again, there is a direct correlation between the activity of the silica and the surface area. These materials are classified by stating (BET) nitrogen surface area in accordance with DIN 66131 and DIN 66132 as a measure of the internal and external surface area of the filler in $m^2/g$, and the CTAs surface area in accordance with ASTM D3765 as a measure of the external surface area, which is frequently considered to be the surface area active in rubbers, in $m^2/g$.

If silicas are used in the rubber mixture, these preferably have a (BET) nitrogen surface area of from 50 to 400 $m^2/g$ and a CTAB surface area of from 100 to 300 $m^2/g$.

The total quantity of active fillers is preferably from 2 to 70 phr, particularly preferably from 5 to 60 phr, and very particularly preferably from 10 to 50 phr.

It is relevant to the invention that the fluoro rubber mixture comprises carbon nanotubes. Carbon nanotubes are known to the person skilled in the art as CNT (carbonanotubes), and are not considered to be active fillers. A significant distinction is drawn between single-wall, double-wall, and multiwall CNTs, respectively SWCNTs, DWCNTs, and MWCNTs. All types can be used for the purposes of the present invention.

Since discussions are still continuing about the health-risk aspects of nanoparticles, including CNTs, the CNTs advantageously take the form of what is known as a masterbatch prior to mixing into the rubber mixture. Masterbatch means that the CNTs are present in a carrier matrix. The carrier matrix used can be any of the carrier matrices conventionally used. For the present invention, the CNTs are particularly advantageously present in a carrier matrix made of fluoro rubber. The fluoro rubber that forms the carrier matrix here can be liquid or solid, that is, the fluoro rubber used can have any molecular weight. However, a solid fluoro rubber has proven to be a particularly useful carrier matrix. The use of fluoro rubber as carrier matrix for the CNTs does not increase complexity in a fluoro rubber mixture, and exhibits no significant effect on the other physical properties of the mixture.

The total quantity of CNTs is preferably from 0.1 to 10 phr, particularly preferably from 0.5 to 5 phr, and very particularly preferably from 1 to 3 phr.

The use of CNTs has the further advantage that the conductivity of the fluoro rubber mixture rises significantly, and even if it is not actually required by customers or by standards it is particularly advantageous for various intended uses of the fluoro rubber mixture, for example, the use in charge-air hoses or in oil hoses and fuel hoses.

The phr (parts per hundred parts of rubber by weight) unit used in this specification is the conventional unit of quantity for mixture formulations in the rubber industry. The quantities added of the individual substances in parts by weight here are always related to 100 parts by weight of the entire composition of all of the rubbers present in the mixture.

It is preferable that the rubber mixture comprises no, or only small quantities of, other inert fillers, that is, that the total quantity of inert fillers is from 0 to 20 phr, preferably from 0 to 10 phr, very particularly preferably from 0 to 5 phr. It is particularly preferable that the rubber mixture comprises no inert fillers, that is, that the total quantity is 0 phr. The quantity of CNTs is not added here to the total quantity of inert fillers. Among the inert fillers are in particular, chalk, kieselgur, alumina gel, asphalt, hard rubber dust, inorganic and organic pigments, glass beads, limestone ($CaCO_3$), silica (inert), carbon black (inert), wood flour, nutshell flour, kaolin, feldspar, and talc powder.

The presence of at least one resin has also proven to be advantageous for the solution of the problem addressed. Resins have been known for a long time as substances for addition to rubber mixtures. They serve mainly as processing aids, and provide the tackiness that the unvulcanized rubber mixtures required. The resins can also be used to influence certain vulcanizate properties, for example hardness, modulus properties, and swelling properties. Surprisingly, the use of at least one resin reveals an additional improvement in the tensile strain at break properties of the rubber mixture. Examples of typical resins used in the rubber industry are hydrocarbon resins, for example petroleum resins, terpene resins, and coal tar resins, and natural resins, for example rosin and tall resin, and epoxy resins, melamine resins, polyester resins, polyurethane resins, acrylic resins, fluoro resins, and vinyl ester resins, ketone resins, and phenolic resins.

In particular, coal tar resins such as coumarone-indene resins, reveal a positive effect on tensile strain at break properties.

The fluoro rubber used can comprise any of the fluoro rubbers known to the person skilled in the art. It is equally possible to use the copolymers, for example poly(vinylidene fluoride-co-hexafluoropropylene) (VDF/HFP), poly(vinylidene fluoride-co-hexafluoropropylene-co-tetrafluoroethylene) (TFB), poly(vinylidene fluoride-co-tetrafluoroethylene-co-perfluorinated methyl vinyl ether) (VDF/TFE/PMVE), poly(tetrafluoroethylene-co-propylene) (TFE/P) and poly(vinylidene fluoride-co-chlorotrifluoroethylene) (VDF/CTFE).

It is preferable that the fluoro rubber used in the fluoro rubber mixture is a copolymer or terpolymer where the proportion of fluorine is from 50 to 70%.

The fluoro rubber can be used individually or in a blend with at least one other fluoro rubber, for example fluorosilicone, polytetrafluoroethylene (PTFE) or perfluoroethylenepropylene (FEP).

The total quantity of fluoro rubber is advantageously from 50 to 100 phr, preferably from 70 to 100 phr, particularly preferably from 90 to 100 phr.

A quantity less than 50 phr mostly implies reduced heat resistance, and for most applications, in particular for hoses in the automobile sector, this would no longer then comply with the requirements.

However, the rubber mixture can comprise at least one other rubber.

Materials which have proven to be suitable here for the application in the field of hoses are in particular nitrile rubber, hydrogenated nitrile rubber, hydrogenated acrylonitrile-butadiene rubber, chloroprene rubber, butyl rubber, halobutyl rubber, and ethylene-propylene-diene rubber.

The rubber mixture also comprises other additional substances, for example the crosslinking system comprising a crosslinking agent and an accelerator. If required by the nature of the rubber mixture, which can vary in a multilayer hose, the mixture ingredients also comprise a processing aid and/or a plasticizer and/or an antioxidant, and also optionally other additional substances, for example fibers and color pigments. Processing aids can in particular be carnauba waxes, pentaerythrityl tetrastearates, soaps, fatty acid esters, phosphoric esters, boric esters, amides, aliphatic and olefinic waxes, and aliphatic and olefinic amines, and mixtures of these. Controlled use of these processing aids ensures processability via viscosity reduction.

Crosslinking can be achieved by using bisphenols, peroxides, or else bisamines. Mixed forms of these types of crosslinking are also possible.

Another object of the invention consists in providing a hose with an internal layer that features optimized tear-propagation resistance at the same time as improved processability.

This object is achieved in that the hose has an internal layer as barrier layer with respect to aggressive media which is composed of a rubber mixture comprising at least one fluoro rubber and at least one active filler, and carbon nanotubes. The hose moreover has an external layer made of a crosslinked rubber mixture.

The descriptions already provided at an earlier stage above relating to the rubber mixture of the invention are applicable in relation to the composition of the rubber mixture, especially in respect of the fluoro rubber, the active fillers, the CNTs, and other constituents.

The hose of the invention can have been extruded or wound, and in the simplest case is composed of two layers, namely an external layer and an internal layer. However, it is also possible that additional layers are also present. These can be intermediate layers and/or reinforcement layers.

A three-layer hose is also often used, composed of an internal layer, reinforcement layer, and external layer.

Preferred variants will now be presented in relation to the external layer and the other possible layers, abbreviations applicable here being: FKM (fluoro rubber), ACM (acrylate rubber), AEM (ethylene-acrylate rubber), EPM (ethylene-propylene rubber (copolymer)), EPDM (ethylene-propylene-diene rubber (copolymer)), and VMQ (silicone rubber).

External Layer

The rubber component of the rubber mixture is preferably FKM, ACM, AEM, EPM, EPDM or VMQ, or a blend of the abovementioned rubber components with at least one further rubber component, for example an AEM/EPDM blend. However, rubber mixtures not comprising blends are mostly used. Since requirements placed upon the external layer differ from those placed upon the internal layer, it is not necessary here to use the fluoro rubber mixture of the internal layer. The standard FKM mixtures of the prior art are often sufficient here. If the external layer is also in contact with an acidic medium, or if the layer is exposed to extreme thermal or dynamic load, it is then clearly possible to use the solution also used for the internal layer.

Rubber mixtures based on ACM and or AEM are in particular crosslinked by diamines.

Rubber mixtures based on EPM, EPDM or VMQ are in turn preferably crosslinked by peroxides.

Reinforcement Layer

The reinforcement layer is composed of a woven fabric or knitted fabric, in particular based on a material used for textiles. Materials relevant here can be polyamide (PA), polyimide (PI), aramid, in particular para-aramid or meta-aramid, polyvinyl acetal (PVA), polyetheretherketone (PEEK), polyester, in particular polyethylene terephthalate (PET), or polyethylene 2,6 naphthalate (PEN), polysulfone (PSU), polyoxadiazole (POD), polyphenylene, or polyphenylene derivative, in particular polyphenylene sulfide (PPS), or glass fibers. Hybrid versions, that is, mixed forms of those mentioned, can also be used, for example in the form of a mixed thread made of m- and p-aramid, or of PPS and PA. The PPS, being a high-performance material, contributes to high strength, while the PA contributes not only to reinforcement but also, because it can be activated to provide adhesion, to improved adhesion in relation to the surrounding elastomeric material.

Intermediate Layer

The intermediate layer also has the function of a layer providing adhesion between the internal layer and the reinforcement layer. The rubber component of the rubber mixture is preferably ACM or AEM, or a blend of the abovementioned rubber components with at least one other rubber component, for example again an AEM/EPDM blend. However, rubber mixtures not comprising blends are mostly used, and AEM crosslinked by diamines is of particular importance here.

The hose of the invention is in particular used for air-conveying hoses, for example charge-air hoses, carbon black particle filter hoses, diesel particle filter hoses, control hoses, but is also used for fuel hoses and oil hoses, for example turbocharger cooling hoses.

The invention will now be explained in more detail with reference to comparative and inventive examples which have been collated in Tables 1a and 1b. The mixtures identified with "I" here are exemplary mixtures of the invention, while the mixtures identified with "C" are comparative mixtures.

The upper part of each table here presents the composition of the mixture, while the lower part of each table shows the corresponding physical properties associated therewith.

In all of the mixture examples contained in the tables the quantitative units are parts by weight in relation to 100 parts by weight of all of the rubber (phr).

TABLE 1a

| Constituents | Unit | C1 | C2 | C3 | C4 | I1 | I2 |
|---|---|---|---|---|---|---|---|
| FKM[a] | phr | 100 | 100 | 100 | 100 | 91.5 | 86.5 |
| N 220 carbon black | phr | 20 | — | — | 15 | 5 | 5 |
| N 772 carbon black | phr | — | 20 | — | — | — | — |
| N 990 carbon black | phr | — | — | 20 | — | — | — |
| VN3 silica | phr | — | — | — | 8 | 8 | 8 |
| Processing aid 1 | phr | 1 | 1 | 1 | 1 | 1 | 1 |
| Processing aid 2 | phr | 2 | 2 | 2 | 0 | 0 | 0 |
| Coumarone-indene resin | phr | 0.75 | 0.75 | 0.75 | 0 | 0 | 0 |
| 70% TAIC | phr | 3.5 | 3.5 | 3.5 | 3.5 | 3.5 | 3.5 |
| 45% organic peroxides | phr | 1.8 | 1.8 | 1.8 | 1.8 | 1.8 | 1.8 |
| CNT[b] | | — | — | — | — | 10 | — |
| CNT[c] | | — | — | — | — | — | 15 |

[a]peroxidic copolymer, 66% by weight of fluorine
[b]15% by weight of MW CNT in FKM
[c]10% by weight of MW CNT in FKM TABLE 1b

| Constituents | Unit | C1 | C2 | C3 | C4 | I1 | I2 |
|---|---|---|---|---|---|---|---|
| Density DIN EN ISO 1183-1 | g/cm$^3$ | 1.78 | 1.79 | 1.78 | 1.8 | 1.8 | 1.8 |
| Mooney viscosity ML1 + 4, ASTM D1646 | Mooney | 135 | 85 | 70 | 110 | 114 | 113 |
| Hardness DIN 53505 | Shore A | 76 | 71 | 67 | 77 | 81 | 84 |
| Tensile strength DIN 53504 S3A | N/mm$^2$ | 22.8 | 17.6 | 13.0 | 23.8 | 24.2 | 21.9 |
| Tensile strain at break DIN 53504 S3A | % | 673 | 571 | 575 | 456 | 517 | 493 |
| Tear-propagation resistance DIN ISO 34-1A | N/mm | 13.6 | 7.3 | 6.1 | 9.2 | 13.9 | 10.1 |

From Table 1b it can be seen that the use of active fillers, in particular active carbon blacks, in combination with CNTs further improves tear-propagation resistance. At the same time it can be seen that the properties of the material in I1 and I2 are better than in C4. It was thus possible to make a further reduction in the quantity of carbon black and at the same time obtain properties comparable to C4. This can then provide a further reduction of viscosity, as clear from C1 to C4 in comparison, and thus further improve processability.

BRIEF DESCRIPTION OF THE DRAWING

The disclosure will now be described with reference to the single FIGURE of the drawing (FIG. 1) which shows a hose 1, which is a curved hose.

DESCRIPTION OF THE PREFERRED EMBODIMENTS OF THE INVENTION

The hose shown in FIG. 1 has the following layer structure with the following examples of materials used:
Internal layer 2: Fluoro rubber mixture crosslinked by peroxides and comprising at least one fluoro rubber and at least one active filler and CNTs
Intermediate layer 3: VMQ rubber mixture crosslinked by diamines and comprising no blend
Reinforcement layer 4: Textile filaments made of aramid
External layer 5: VMQ rubber mixture crosslinked by diamines and comprising no blend It is understood that the foregoing description is that of the preferred embodiments of the invention and that various changes and modifications may be made thereto without departing from the spirit and scope of the invention as defined in the appended claims.

Key (Part of the Description)
1 Hose
2 Internal layer (barrier layer)
3 Intermediate layer
4 Reinforcement layer
5 External layer

What is claimed is:

1. A rubber mixture comprising:
at least one fluoro rubber;
at least one active filler; and,
carbon nanotubes.
2. The rubber mixture as claimed in claim 1, comprising: from 50 to 100 phr of a fluoro rubber or from 50 to 100 phr of a blend made of two or more fluoro rubbers.
3. The rubber mixture as claimed in claim 1, comprising: from 2 to 70 phr of the at least one active filler.
4. The rubber mixture as claimed in claim 1, comprising: from 0.1 to 10 phr of carbon nanotubes.
5. The rubber mixture as claimed in claim 1, further comprising from 0 to 20 phr of inert fillers.
6. The rubber mixture as claimed in claim 1, further comprising at least one resin.
7. The rubber mixture as claimed in claim 1, wherein the fluoro rubber is one or more of poly(vinylidene fluoride-co-hexafluoropropylene) (VDF/HFP), poly(vinylidene fluoride-co-hexafluoropropylene-co-tetrafluoroethylene) (TFB), poly(vinylidene fluoride-co-tetrafluoroethylene-co-perfluorinated methyl vinyl ether) (VDF/TFE/PMVE), poly(tetrafluoroethylene-co-propylene) (TFE/P), and poly(vinylidene fluoride-co-chlorotrifluoroethylene) (VDF/CTFE).
8. The rubber mixture as claimed in claim 1, wherein the fluoro rubber comprises a copolymer or terpolymer where the proportion of fluorine is from 50 to 70%.
9. The rubber mixture as claimed in claim 1, wherein the rubber mixture comprises no inert fillers, or less than 5 phr of inert filler.
10. The rubber mixture as claimed in claim 1, wherein the active filler is active carbon black.
11. The rubber mixture as claimed in claim 10, wherein the iodine number of the active carbon black is from 60 to 300 g/kg in accordance with ASTM D1510, and the DBP number thereof is from 60 to 150 $cm^3$/100 g in accordance with ASTM D2414.
12. A hose having a layer structure comprising:
an internal layer as barrier layer with respect to aggressive media, which comprises at least one fluoro rubber, at least one active filler, and carbon nanotubes, and
an external layer made of a crosslinked rubber mixture.
13. The hose as claimed in claim 12 having no reinforcement layer, wherein the hose consists of an internal layer and an external layer.
14. The hose as claimed in claim 12, further comprising:
a reinforcement layer arranged between the internal layer and the external layer,
wherein the reinforcement layer is composed of one or more sublayers.
15. The hose as claimed in claim 12, wherein the internal layer comprises from 50 to 100 phr of a fluoro rubber or from 50 to 100 phr of a blend made of two or more fluoro rubbers.
16. The hose as claimed in claim 12, wherein the internal layer comprises from 2 to 70 phr of the at least one active filler.
17. The hose as claimed in claim 12, wherein the active filler is an active carbon black.
18. The hose as claimed in claim 12, wherein the internal layer comprises from 0.1 to 10 phr of carbon nanotubes.

* * * * *

UNITED STATES PATENT AND TRADEMARK OFFICE
CERTIFICATE OF CORRECTION

| | | |
|---|---|---|
| PATENT NO. | : 9,815,960 B2 | |
| APPLICATION NO. | : 14/880868 | |
| DATED | : November 14, 2017 | |
| INVENTOR(S) | : S. Seibold et al. | |

It is certified that error appears in the above-identified patent and that said Letters Patent is hereby corrected as shown below:

In the Specification

In Column 2:
Line 53: delete "CTAs" and substitute -- CTAB -- therefor.

Signed and Sealed this
Sixth Day of February, 2018

Joseph Matal
*Performing the Functions and Duties of the*
*Under Secretary of Commerce for Intellectual Property and*
*Director of the United States Patent and Trademark Office*